United States Patent
Murakami

(10) Patent No.: US 10,630,182 B2
(45) Date of Patent: Apr. 21, 2020

(54) MULTIPHASE CONVERTER SYSTEM FOR VARIABLE DRIVING OF PHASES BASED ON COOLING MEDIUM TEMPERATURE

(71) Applicant: TOYOTA JIDOSHA KABUSHIKI KAISHA, Toyota-shi, Aichi-ken (JP)

(72) Inventor: Akinobu Murakami, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/232,866

(22) Filed: Dec. 26, 2018

(65) Prior Publication Data
US 2019/0214913 A1    Jul. 11, 2019

(30) Foreign Application Priority Data

Jan. 10, 2018 (JP) .................................. 2018-002194

(51) Int. Cl.
| | |
|---|---|
| H02M 3/158 | (2006.01) |
| H02P 29/68 | (2016.01) |
| H02P 27/06 | (2006.01) |
| H02M 1/00 | (2006.01) |

(52) U.S. Cl.
CPC .......... H02M 3/1584 (2013.01); H02P 29/68 (2016.02); H02M 2001/0032 (2013.01); H02M 2001/0054 (2013.01); H02M 2003/1586 (2013.01); H02P 27/06 (2013.01); H02P 2201/09 (2013.01)

(58) Field of Classification Search
None
See application file for complete search history.

(56) References Cited

U.S. PATENT DOCUMENTS

| | | | |
|---|---|---|---|
| 2010/0207598 A1* | 8/2010 | Hamatani | H02M 1/32 323/351 |
| 2016/0114788 A1* | 4/2016 | Kamatani | B60K 6/445 701/22 |
| 2016/0155278 A1* | 6/2016 | Nozawa | G01K 3/10 |
| 2016/0254212 A1* | 9/2016 | Kusaka | H01L 23/34 361/699 |
| 2016/0276935 A1* | 9/2016 | Arai | B60L 3/0023 |

FOREIGN PATENT DOCUMENTS

JP    2011-019338 A    1/2011

* cited by examiner

*Primary Examiner* — Jeffrey A Gblende
(74) *Attorney, Agent, or Firm* — Oliff PLC

(57) ABSTRACT

A multiphase converter system includes a multiphase converter in which a plurality of converters are connected in parallel; a cooler in which a cooling medium flows so as to cool the multiphase converter; a temperature sensor configured to measure a temperature of the cooling medium; and a controller. The controller is configured to drive the converter for n phase or the converters for n phases when a target output of the multiphase converter is lower than a prescribed output threshold and the temperature of the cooling medium falls within a prescribed temperature range, and to drive the converters for m phases when the target output is lower than the prescribed output threshold and the temperature of the cooling medium is lower than the prescribed temperature range, m being larger than n.

3 Claims, 3 Drawing Sheets

MULTIPHASE CONVERTER SYSTEM FOR VARIABLE DRIVING OF PHASES BASED ON COOLING MEDIUM TEMPERATURE

INCORPORATION BY REFERENCE

The disclosure of Japanese Patent Application No. 2018-002194 filed on Jan. 10, 2018 including the specification, drawings and abstract is incorporated herein by reference in its entirety.

BACKGROUND

1. Technical Field

The disclosure relates to a multiphase converter system including a multiphase converter in which a plurality of converters are connected in parallel, and a cooler.

2. Description of Related Art

There has been known a multiphase converter configured such that a plurality of converters for converting electric power with the use of a switching element are connected in parallel and the number of phases (i.e., the number of phases of converters) to be driven is changed in accordance with a target output. Japanese Unexamined Patent Application Publication No. 2011-19338 (JP 2011-19338 A) describes a multiphase converter in which a plurality of boost converters are connected in parallel. The multiphase converter of JP 2011-19338 A is connected to a fuel cell and increases an output voltage of the fuel cell. In the multiphase converter of JP 2011-19338 A, in order to reduce a thermal load of the switching elements of the driven boost converters, when the temperatures of the switching elements exceed a prescribed temperature threshold, the number of phases to be driven is increased so that the load is dispersed.

SUMMARY

When a switching element is driven continuously by a large current, it generates heat, and thus, the multiphase converter is often provided with a cooler. When the temperature is low, a withstand voltage of the switching element tends to decrease. Accordingly, in a case where the temperature of a cooling medium is low, an output upper limit (i.e., an upper limit of an output) of the converter may be restricted. In the case where the temperature of the cooling medium is low, it is desirable that the temperature of the cooling medium should be increased promptly so as to achieve a state where the operating switching element can operate with its original withstand voltage characteristic.

A multiphase converter system according to an aspect of the disclosure includes a multiphase converter in which a plurality of converters are connected in parallel, a cooler, a temperature sensor, and a controller. Each of the converters is configured to convert electric power with use of a switching element. The converter may be a converter configured to change a voltage, or an inverter configured to change a direct current to an alternating current. In the cooler, a cooling medium flows so as to cool the multiphase converter. The temperature sensor is configured to measure a temperature of the cooling medium. The controller is configured to drive the converter for n phase or the converters for n phases when a target output of the multiphase converter is lower than a prescribed output threshold and the temperature of the cooling medium falls within a prescribed temperature range, and to drive the converters for m phases when the target output is lower than the prescribed output threshold and the temperature of the cooling medium is lower than the prescribed temperature range, m being larger than n. That is, even in a case where a target output is set to a value that can be achieved by driving the converter for n phase or the converters for n phases if the temperature of the cooling medium falls within a normal temperature range, when the temperature of the cooling medium is low, more converters are driven to increase a heating value so that the temperature of the cooling medium is increased quickly. In the multiphase converter system, when the temperature of the cooling medium is low, the temperature of the cooling medium is increased promptly, thereby making it possible to promptly achieve a state where the switching element can operate with its original withstand voltage characteristic. Typically, the controller may be configured to drive the converters for all phases when the temperature of the cooling medium is lower than the prescribed temperature range and the target output of the multiphase converter is lower than the prescribed output threshold.

The converters are boost converters, for example. As has been described earlier, in a case where the temperature of the cooling medium is low and the withstand voltage of the switching element is low, the output of the multiphase converter may be restricted. The controller may be configured to set an upper limit of an output voltage of the multiphase converter to a first voltage upper limit value when the temperature of the cooling medium falls within the prescribed temperature range. The first voltage upper limit value is an upper limit value corresponding to the original withstand voltage characteristic of the switching element. The controller may be configured to set the upper limit of the output voltage of the multiphase converter to a second voltage upper limit value that is lower than the first voltage upper limit value when the temperature of the cooling medium is lower than the prescribed temperature range. That is, in the multiphase converter system, when the temperature of the cooling medium is low, the upper limit of the output voltage may be set to the second voltage upper limit value that is lower than a normal voltage upper limit value (the first voltage upper limit value). However, as has been described earlier, in the multiphase converter system according to the above-described aspect, the temperature of the cooling medium can be increased promptly, and thus, the upper limit value of the output voltage can be returned to the first voltage upper limit value from the second voltage upper limit value promptly.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
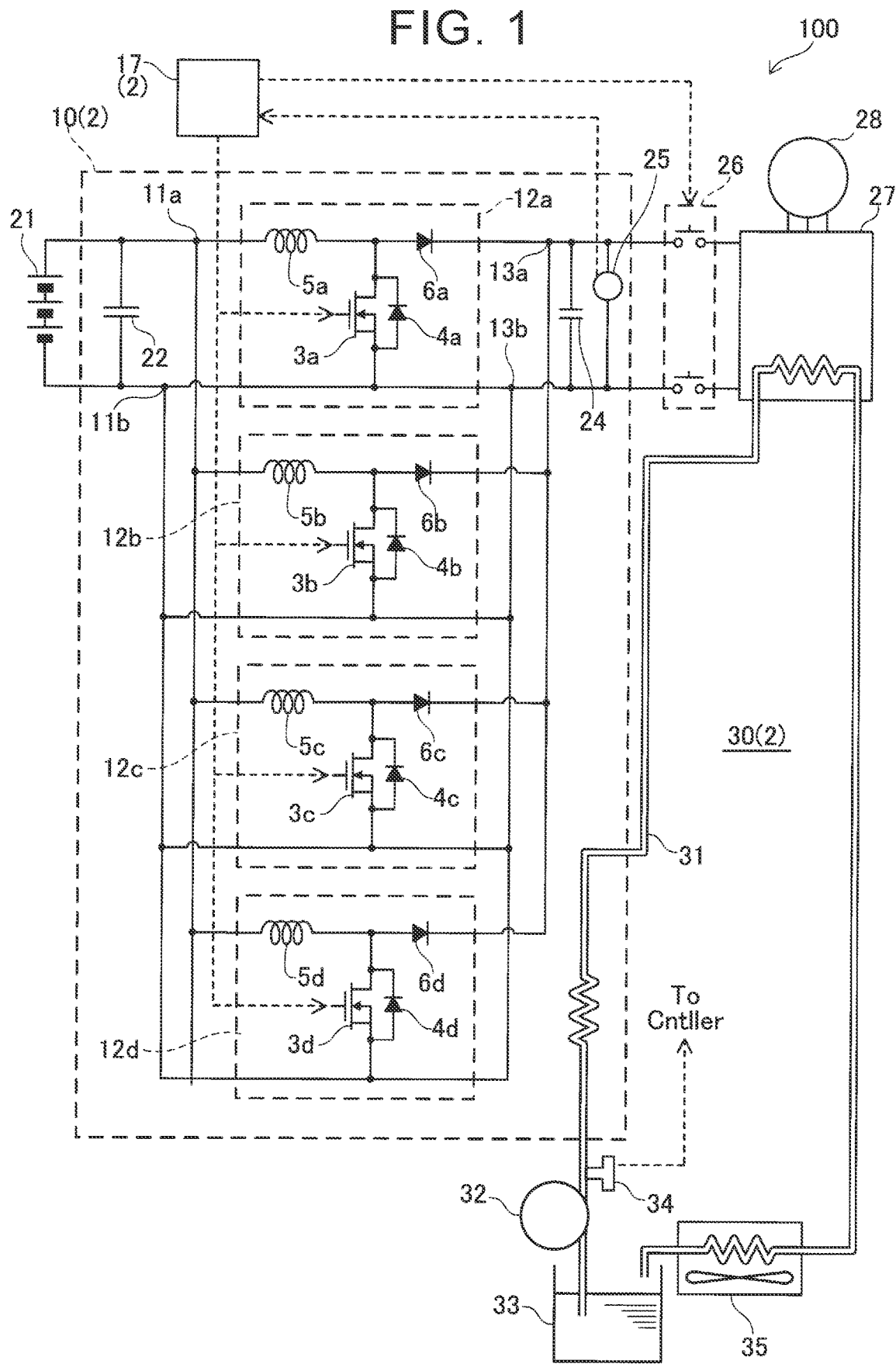
FIG. 1 is a block diagram of a fuel-cell vehicle including a multiphase converter system of an embodiment.

A multiphase converter system according to an embodiment will be described with reference to the drawings. A multiphase converter system 2 of the embodiment is provided in an electric vehicle 100. FIG. 1 is a block diagram illustrating an electric power system of the electric vehicle 100. The electric vehicle 100 includes a multiphase converter system 2, a fuel cell 21, an inverter 27, and a motor 28 for traveling. The electric vehicle 100 is caused to travel by driving the motor 28 with the use of electric power of the fuel cell 21. Note that the electric vehicle 100 also includes a battery in which regenerative electric power generated by the motor 28 is stored, but illustration and description of the battery are omitted.

The multiphase converter system 2 increases (i.e., boosts) a voltage of the electric power output from the fuel cell 21 and supplies the electric power to the inverter 27. The inverter 27 converts a direct-current power, which has been increased in voltage, into an alternating-current power at a frequency suitable for driving the motor 28, and supplies the alternating-current power to the motor 28.

The multiphase converter system 2 includes a multiphase converter 10, a cooler 30, and a controller 17. The multiphase converter 10 increases the voltage of the electric power of the fuel cell 21 and supplies the electric power to the inverter 27. A relay 26 is provided between the multiphase converter 10 and the inverter 27. The relay 26 is a switch configured to connect and disconnect the multiphase converter 10 (the fuel cell 21) and the inverter 27 (the motor 28). The relay 26 is controlled by the controller 17.

The multiphase converter 10 includes four converters 12a to 12d, capacitors 22, 24, and a voltage sensor 25.

The four converters 12a to 12d are connected in parallel between common input ends 11a, 11b and common output ends 13a, 13b. All of the four converters 12a to 12d are boost converters configured to increase a voltage of electric power input therein and output the electric power. All of the converters 12a to 12d are chopper-type boost converters and have the same structure.

Note that the capacitor 22 is connected between the common input ends 11a, 11b, and the capacitor 24 is connected between the common output ends 13a, 13b. The capacitor 22 smoothes a current input into the converters 12a to 12d, and the capacitor 24 smoothes a current output from the converters 12a to 12d.

The following describes the converter 12a. The converter 12a includes a switching element 3a, diodes 4a, 6a, and a reactor 5a. A first end of the reactor 5a is connected to an input-end positive electrode 11a, and a second end thereof is connected to an anode of the diode 6a. A cathode of the diode 6a is connected to an output-end positive electrode 13a.

An input-end negative electrode 11b and an output-end negative electrode 13b of the converter 12a are directly connected to each other. The switching element 3a is connected between the input-end negative electrode 11b (the output-end negative electrode 13b) and an intermediate point between the reactor 5a and the diode 6a. The diode 4a is connected in reverse-parallel to the switching element 3a.

The converters 12b to 12d have the same structure as that of the converter 12a. The converter 12b includes a switching element 3b, diodes 4b, 6b, and a reactor 5b. The converter 12c includes a switching element 3c, diodes 4c, 6c, and a reactor 5c. The converter 12d includes a switching element 3d, diodes 4d, 6d, and a reactor 5d.

The switching elements 3a to 3d are controlled by the controller 17. When the switching elements 3a to 3d are turned on and off at a prescribed duty ratio (i.e., a prescribed duty cycle), the output power of the fuel cell 21, which is applied to the input ends 11a, 11b, is increased in voltage and output from the output ends 13a, 13b. The circuit and operation of the converters 12a to 12d in FIG. 1 are well known, and therefore, detailed descriptions thereof are omitted. The switching elements 3a to 3d are insulated gate bipolar transistors (IGBT), for example.

Dashed arrows in FIG. 1 indicate communication lines between the controller 17 and other components. Note that, in FIG. 1, the text "ToCntller" indicates a communication line through which data is transmitted to the controller 17, and each dashed arrow extending from the controller 17 indicates a communication line through which a command is transmitted from the controller 17.

The controller 17 supplies the same driving signal to the switching elements 3a to 3d. Since the converters 12a to 12d having the same structure operate due to the same driving signal, the four converters 12a to 12d operate like one converter. A voltage sensor 25 is provided between the output ends 13a, 13b, and the controller 17 performs a feedback control for the switching elements 3a to 3d so that an output voltage measured by the voltage sensor 25 matches a target output voltage.

When a large current flows through the switching elements 3a to 3d and the reactors 5a to 5d for a long time, they generate heat. Accordingly, the multiphase converter system 2 includes a cooler 30 configured to cool the switching elements 3a to 3d, the reactors 5a to 5d, and the inverter 27. The cooler 30 includes a circulation passage 31 through which a cooling medium flows, a pump 32 configured to pump (i.e., deliver under pressure) the cooling medium in the circulation passage 31, a reserve tank 33 in which the cooling medium is temporarily stored, a radiator 35 configured to discharge heat of the cooling medium to an external air, and a temperature sensor 34. The cooling medium is liquid and is typically water or long life coolant (LLC).

The cooling medium is circulated through the multiphase converter 10, the inverter 27, the radiator 35, and the reserve tank 33 via the circulation passage 31. The pump 32 pumps the cooling medium of the reserve tank 33 to the multiphase converter 10. While the cooling medium passes through the multiphase converter 10 and the inverter 27, the cooling medium absorbs heat of the multiphase converter 10 and the inverter 27. The cooling medium, which has absorbed the heat and becomes high in temperature, discharges, at the radiator 35, the heat thus absorbed to the external air, and thus, the temperature of the cooling medium decreases. The cooling medium, which has decreased in temperature, returns to the reserve tank 33. The temperature sensor 34 measures the temperature of the cooling medium. A value measured by the temperature sensor 34 is transmitted to the controller 17. The pump 32 is also controlled by the controller 17. The controller 17 determines an output of the pump 32 (i.e., a discharge amount of the cooling medium) based on the temperature of the cooling medium measured by the temperature sensor 34 and operation states of the multiphase converter 10 and the inverter 27, and controls the pump 32. In brief, the controller 17 increases the output of the pump 32 as the temperature of the cooling medium increases.

The controller 17 controls the multiphase converter 10 in response to a command from a high-order controller (not shown). The high-order controller determines a torque (a target torque) to be output from the motor 28 for traveling based on an accelerator operation amount, a vehicle speed, an output of the fuel cell 21, and the like. The high-order controller determines a voltage (a target output voltage) and a current (a target output current) to be output from the multiphase converter 10 based on an output voltage of the fuel cell 21 and the target torque, and transmits a command to the controller 17. The controller determines the number of converters to be operated based on the magnitude of the target output current and supplies a driving signal at a prescribed duty ratio (i.e., a prescribed duty cycle) to the switching elements of the selected converters.

The controller 17 of the multiphase converter system 2 determines the step-up ratio of the converters 12a to 12d based on the target output voltage transmitted from the high-order controller (not shown). Further, the controller 17 selects converters to be operated from among the converters 12a to 12d based on the magnitude of the target output current transmitted from the high-order controller. As the target output current increases, the controller 17 increases the number of converters to be operated from one phase to four phases.

Figure 2:
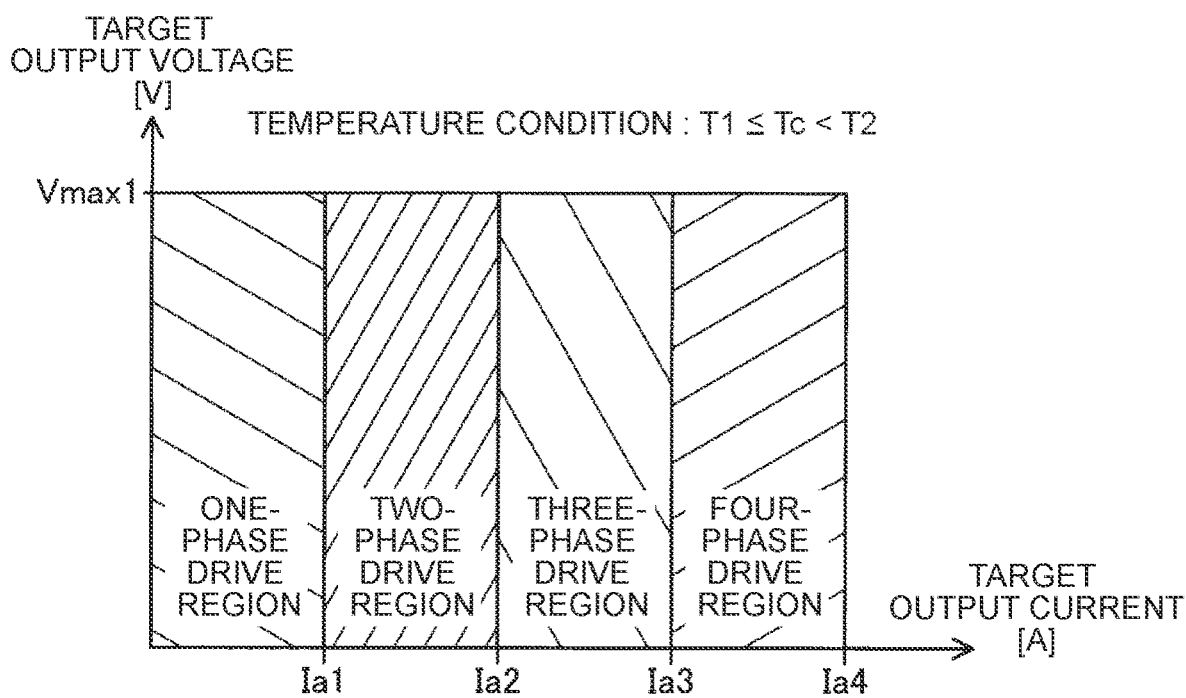
FIG. 2 is a map for determining the number of converters to be driven (when a temperature of cooling medium is in a normal temperature range)

FIG. 2 illustrates a relationship between the target output current and the number of phases to be driven (i.e., the number of phases of converters to be driven). FIG. 2 is a map for determining the number of converters to be driven. The vertical axis in FIG. 2 indicates a target output voltage, and the horizontal axis indicates a target output current. The controller 17 drives a converter for one phase (e.g., the converter 12a) until the target output current reaches a first current value Ia1. When the target output current is larger than the first current value Ia1 and is equal to or smaller than a second current value Ia2, the controller 17 drives converters for two phases (e.g., the converters 12a, 12b). When the target output current is larger than the second current value Ia2 and is equal to or smaller than a third current value Ia3, the controller 17 drives converters for three phases (e.g., the converters 12a, 12b, 12c). When the target output current is larger than the third current value Ia3, the controller 17 drives all the converters 12a to 12d.

In the multiphase converter 10, as the target output current increases, the number of converters 12a to 12d (the number of phases) to be driven is increased. By changing the number of converters to be driven in accordance with the target output current, it is possible to limit an operating range (a range of an output current) of one converter to a narrow range and to increase an operating range (a range of an output current) of the whole multiphase converter 10. By narrowing the operating ranges of individual converters, only a range with good conversion efficiency can be used, thereby making it possible to increase the efficiency of the whole multiphase converter 10.

Note that the map in FIG. 2 is a map in a case where a cooling medium temperature Tc is equal to or higher than a first temperature threshold T1 and lower than a second temperature threshold T2. While the cooling medium temperature Tc falls within the temperature range (T1≤Tc<T2), the controller 17 sets an upper limit value of the output voltage of the multiphase converter 10 to a first voltage upper limit value Vmax1. The first voltage upper limit value Vmax1 is a normal upper limit value for the converters 12a to 12d. In the multiphase converter 10 of the embodiment, the number of phases of converters to be driven is not changed in accordance with the magnitude of the target output voltage.

Figure 3:
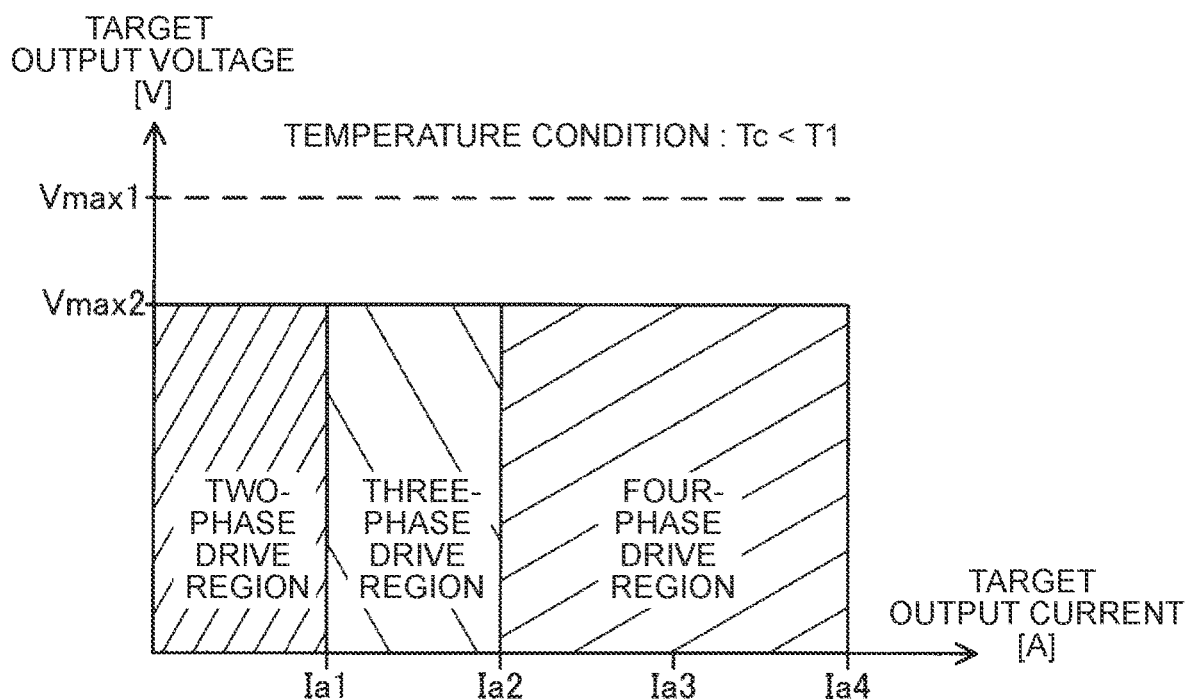
FIG. 3 is a map for determining the number of converters to be driven (when the temperature of the cooling medium is low)

When an operating temperature is extremely low, withstand voltages of the switching elements 3a to 3d used in the converters 12a to 12d tend to decrease. In view of this, when the cooling medium temperature Tc is low, the controller 17 decreases the upper limit value of the output voltages of the converters 12a to 12d. More specifically, when the cooling medium temperature Tc is lower than the first temperature threshold T1, the controller 17 changes (i.e., decreases) the upper limit value of the output voltages of the converters 12a to 12d from the first voltage upper limit value Vmax1 to a second voltage upper limit value Vmax2 (Vmax1>Vmax2). FIG. 3 illustrates a converter driving number determination map in a case where the cooling medium temperature Tc is lower than the first temperature threshold T1. The vertical axis and the horizontal axis are the same as those in the graph of FIG. 2. In FIG. 3, the upper limit value of the target output voltage is decreased from the first voltage upper limit value Vmax1 to the second voltage upper limit value Vmax2.

The fact that a low voltage upper limit value is set for the multiphase converter 10 (the converters 12a to 12d) is equivalent to the fact that an output upper limit value (i.e., an upper limit value of an output) of the motor 28 for traveling is lowered. In other words, when a low voltage upper limit value is set for the multiphase converter 10 (the converters 12a to 12d), the output upper limit value of the motor 28 for traveling is lowered. When the output upper limit value of the motor 28 is lowered, original performance of the motor 28 cannot be provided, and thus, the drivability of the vehicle decreases. In view of this, when the cooling medium temperature Tc is low, the controller 17 increases the number of converters to be driven in comparison with a case where the cooling medium temperature Tc falls within the normal temperature range (T1≤Tc<T2). Each of the converters includes a reactor, and a main factor causing heat generation is a steady loss (a core loss and a hysteresis loss) of the reactor. Accordingly, even in a case where the output of the multiphase converter 10 remains the same, as the number of reactors through which a current flows is larger, a gross heating value of the multiphase converter 10 increases. Further, as the number of phases to be driven (i.e., the number of phases of converters to be driven) is increased, the number of driving circuits to be driven also increases. The driving circuits are circuits configured to drive switching elements for respective phases. The increase in the number of driving circuits to be driven also increases the heating value. The heating value of the multiphase converter 10 is increased to increase the cooling medium temperature such that the upper limit value of the output voltage of the multiphase converter 10 promptly returns to an original voltage upper limit value (the first voltage upper limit value Vmax1).

As can be understood from the comparison between FIG. 2 and FIG. 3, in a case where the target output current is equal to or lower than the first current value Ia1, when the cooling medium temperature Tc falls within the normal temperature range (T1≤Tc<T2), the controller 17 drives a converter for one phase, and when the cooling medium temperature Tc is low (Tc<T1), the controller 17 drives converters for two phases.

In a case where the target output current is larger than the first current value Ia1 and is equal to or smaller than the second current value Ia2, when the cooling medium temperature Tc falls within the normal temperature range (T1≤Tc<T2), the controller 17 drives converters for two phases, and when the cooling medium temperature Tc is low (Tc<T1), the controller 17 drives converters for three phases.

In a case where the target output current is larger than the second current value Ia2 and is equal to or smaller than the third current value Ia3, when the cooling medium temperature Tc falls within the normal temperature range (T1≤Tc<T2), the controller 17 drives converters for three phases, and when the cooling medium temperature Tc is low (Tc<T1), the controller 17 drives converters for four phases. In a case where the target output current is larger than the third current value Ia3, when the cooling medium temperature Tc falls within the normal temperature range (T1≤Tc<T2), the controller 17 drives converters for all phases (four phases), and when the cooling medium temperature Tc is low (Tc<T1), the controller 17 drives converters for all phases (four phases).

As described above, in a case where the target output current is lower than the third current value Ia3, when the cooling medium temperature Tc falls within a prescribed temperature range (T1≤Tc<T2), the controller 17 drives a converter for n phase or converters for n phases. When the cooling medium temperature Tc is lower than the temperature range (Tc<T1), the controller 17 drives converters for m phases, m being larger than n. Herein, n=1 to 3 is satisfied.

When the cooling medium temperature Tc is low (Tc<T1), the number of converters to be driven is increased in comparison with a case where the cooling medium temperature Tc falls within the normal temperature range (T1≤Tc<T2), and thus, the heating value of the multiphase converter 10 increases. When the heating value of the multiphase converter 10 increases, the cooling medium temperature Tc easily increases. When the cooling medium temperature Tc exceeds the first temperature threshold T1, the map for determining the number of converters to be driven is switched from the map of FIG. 3 to the map of FIG. 2, and thus, the voltage upper limit value of the multiphase converter 10 is returned from the low second voltage upper limit value Vmax2 to the normal first voltage upper limit value Vmax1. Since the voltage upper limit value of the multiphase converter 10 returns to its original value, the electric vehicle 100 can demonstrate its original drivability.

Figure 4:
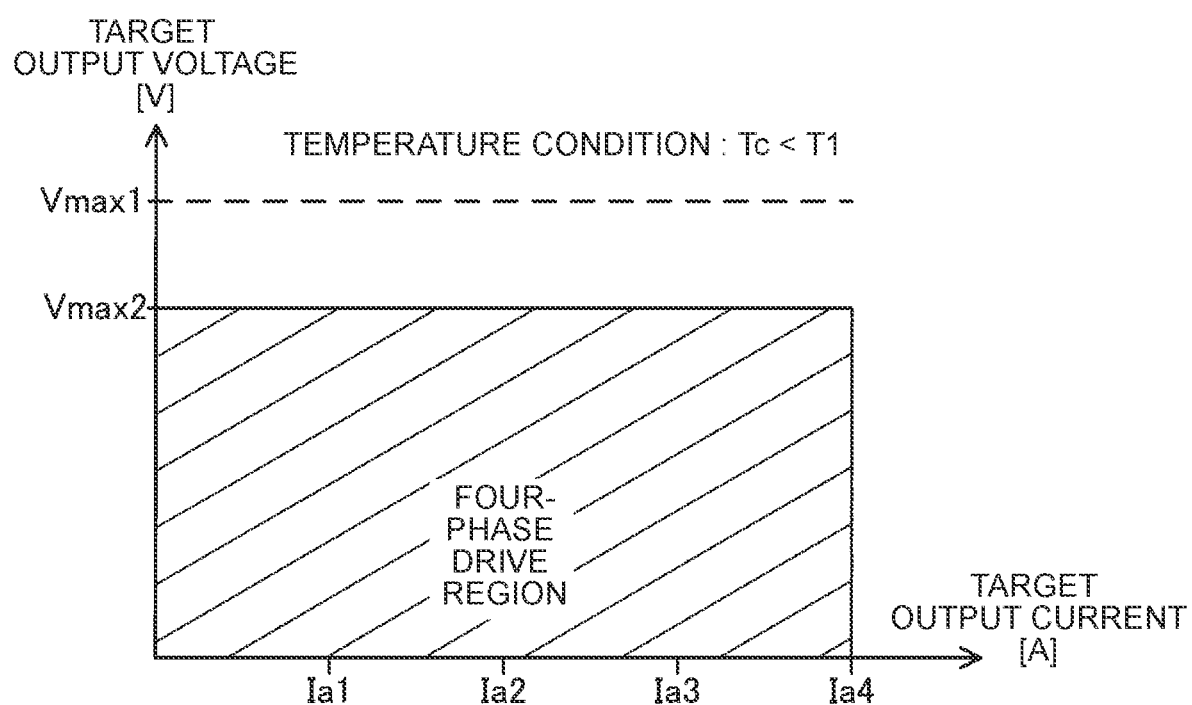
FIG. 4 is a map for determining the number of converters to be driven (a modified example).

When the cooling medium temperature Tc is lower than the prescribed temperature threshold (the first temperature threshold T1), the controller 17 may employ a map of FIG. 4 instead of the map of FIG. 3. FIG. 4 is a modified example of a driving number determination map. In the map of FIG. 4, when the cooling medium temperature Tc is low, four phases are set to be driven over the whole range of the target output current. In a case where the map of FIG. 4 is employed, when the cooling medium temperature Tc is lower than the prescribed temperature threshold (the first temperature threshold T1), the controller 17 always drives the converters 12a to 12d for all phases (four phases). By driving all phases, the heating value of the multiphase converter 10 increases, and thus, the cooling medium temperature Tc easily increases.

The following summarizes the feature of the multiphase converter system 2 described in the embodiment. The multiphase converter system 2 includes the plurality of converters 12a to 12d connected in parallel, the cooler 30, the temperature sensor 34, and the controller 17. Each of the converters 12a to 12d is a device configured to convert electric power with the use of a switching element. The converters 12a to 12d are converters of the same type (same kind) and have the same structure and the same characteristic. In the cooler 30, a cooling medium flows so as to cool the converters 12a to 12d. The temperature sensor 34 measures the temperature of the cooling medium. In a case where the target output current of the multiphase converter 10 is lower than a prescribed output threshold (the third current value Ia3) and the cooling medium temperature Tc falls within a prescribed temperature range (T1≤Tc<T2), the controller drives a converter for n phase or converters for n phases. In a case where the target output current is lower than the output threshold (the third current value Ia3) and the cooling medium temperature Tc is lower than the temperature range (Tc<T1), the controller 17 drives converters for m phases, m being larger than n. Here, n and m are integer numbers larger than 1 and m>n is satisfied.

The converters 12a to 12d include the reactors 5a to 5d, respectively, and the reactors 5a to 5d are one factor causing heat generation.

In a case where the target output current is lower than the output threshold (the third current value Ia3) and the cooling medium temperature Tc is lower than the temperature range (Tc<T1), the controller 17 may drive converters for all phases.

The converters 12a to 12d may be boost converters. When the cooling medium temperature Tc falls within the temperature range (T1≤Tc<T2), the controller 17 sets the upper limit of the output voltage of the converters 12a to 12d to the first voltage upper limit value Vmax1. When the cooling medium temperature Tc is lower than the temperature range (Tc<T1), the controller 17 sets the upper limit of the output voltage of the multiphase converter 10 to the second voltage upper limit value Vmax2 that is lower than the first voltage upper limit value Vmax1.

Notes regarding the technique in the embodiment will be described. The multiphase converter system 2 of the embodiment is configured such that the converters 12a to 12d are connected in parallel. The technique described in the present specification is applicable to a multiphase converter in which a plurality of buck converters (i.e., step-down converters) are connected in parallel and to a multiphase converter in which a plurality of bidirectional DC-DC converters are connected in parallel. Alternatively, the technique is applicable to a multiphase converter in which a plurality of inverters are connected in parallel. The number of converters connected in parallel is not limited.

In the embodiment, the target output for determining the number of converters to be driven is the target output current. The target output may be given in terms of voltage or may be given in terms of electric power.

The embodiment of the disclosure has been described in detail. However, the embodiment is merely illustrative and does not limit the scope of the disclosure. The disclosure includes various modifications and changes that are made to the embodiment described so far. The technical elements described in the disclosure demonstrate technical utility when used singly or in various combinations, and thus the combinations of the technical elements are not limited to the combinations described in the disclosure. In addition, the technique described in the disclosure achieves a plurality of objects simultaneously, and technical utility is provided by achieving at least one of the objects.

What is claimed is:

1. A multiphase converter system comprising:
 a multiphase converter in which a plurality of converters are connected in parallel;
 a cooler in which a cooling medium flows so as to cool the multiphase converter;
 a temperature sensor configured to measure a temperature of the cooling medium; and
 a controller, wherein
 the controller is configured to drive a first number of the converters for n phases when a target output of the multiphase converter is lower than a prescribed output threshold and the temperature of the cooling medium falls within a prescribed temperature range, and to drive a second number of the converters for m phases when the target output is lower than the prescribed output threshold and the temperature of the cooling medium is lower than the prescribed temperature range, m being larger than and n being greater than zero.

2. The multiphase converter system according to claim 1, wherein the controller is configured to drive the plurality of converters for all phases when the target output is lower than the prescribed output threshold and the temperature of the cooling medium is lower than the prescribed temperature range.

3. The multiphase converter system according to claim 1, wherein:

the plurality of converters are boost converters; and the controller is configured to set an upper limit of an output voltage of the multiphase converter to a first voltage upper limit value when the temperature of the cooling medium falls within the prescribed temperature range, and to set the upper limit of the output voltage of the multiphase converter to a second voltage upper limit value that is lower than the first voltage upper limit value when the temperature of the cooling medium is lower than the prescribed temperature range.

* * * * *